United States Patent
Garcia Garcia et al.

(10) Patent No.: US 11,220,061 B2
(45) Date of Patent: Jan. 11, 2022

(54) 3D PRINT DEFINITION PROCEDURES

(71) Applicants: HEWLETT-PACKARD DEVELOPMENT COMPANY, L.P., Houston, TX (US); Luis Garcia Garcia, Sant Cugat del Valles (ES); Salvador Sanchez Ribes, Sant Cugat del Valles (ES)

(72) Inventors: Luis Garcia Garcia, Sant Cugat del Valles (ES); Scott White, Boise, ID (US); Salvador Sanchez Ribes, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 43 days.

(21) Appl. No.: 16/093,702

(22) PCT Filed: May 12, 2016

(86) PCT No.: PCT/EP2016/060704
§ 371 (c)(1),
(2) Date: Oct. 15, 2018

(87) PCT Pub. No.: WO2017/194126
PCT Pub. Date: Nov. 16, 2017

(65) Prior Publication Data
US 2019/0126560 A1    May 2, 2019

(51) Int. Cl.
*B29C 64/393* (2017.01)
*B33Y 30/00* (2015.01)
(Continued)

(52) U.S. Cl.
CPC .......... *B29C 64/393* (2017.08); *B29C 64/165* (2017.08); *B33Y 10/00* (2014.12);
(Continued)

(58) Field of Classification Search
None
See application file for complete search history.

(56) References Cited

U.S. PATENT DOCUMENTS 7,357,483 B2    4/2008  Ide et al.
8,718,522 B2    5/2014  Chillscyzn et al.
(Continued)

FOREIGN PATENT DOCUMENTS

CN    1741895    3/2006
CN    104441656    3/2015
(Continued)

OTHER PUBLICATIONS

Nathan Ostrout; "Quantifying a Fused Deposition Modeling System's Dimensional Performance Through Its Addressability"; May 2015.

*Primary Examiner* — Mohammad Ali
*Assistant Examiner* — Saad M Kabir
(74) *Attorney, Agent, or Firm* — HP Inc. Patent Department (57) ABSTRACT

There is disclosed a non-transitory machine readable storage medium encoded with instructions executable by a processor and comprising instructions to: receive object data corresponding to a three-dimensional object to be generated; define print data for each of a plurality of slices of the object to control a respective layer forming operation in which print agent is ejected on a layer of build material in a pattern corresponding to selective fusing of the build material, wherein the print data and the respective pattern is defined for each slice according to object a print definition procedure; and select the print definition procedure from a plurality of print definition procedures based on a user input. There is also disclosed a corresponding method and additive manufacturing apparatus.

20 Claims, 7 Drawing Sheets

(51) Int. Cl.
*B29C 64/165* (2017.01)
*B33Y 10/00* (2015.01)
*B33Y 50/02* (2015.01)
*G05B 19/4099* (2006.01)

(52) U.S. Cl.
CPC ............... *B33Y 30/00* (2014.12); *B33Y 50/02* (2014.12); *G05B 19/4099* (2013.01); *G05B 2219/49023* (2013.01)

(56) References Cited

U.S. PATENT DOCUMENTS

| 2005/0168507 | A1* | 8/2005 | Ide | B41J 19/147 |
| | | | | 347/12 |
| 2005/0179919 | A1 | 8/2005 | Kato | |
| 2010/0121476 | A1* | 5/2010 | Kritchman | B29C 64/386 |
| | | | | 700/119 |

FOREIGN PATENT DOCUMENTS

| CN | 105328904 | 2/2016 |
| RU | 2567318 | 11/2015 |
| WO | WO2015106816 A1 | 7/2015 |
| WO | WO2015108546 A2 | 7/2015 |
| WO | WO-2015108550 | 7/2015 |
| WO | WO2015167520 A1 | 11/2015 |
| WO | WO2016010536 A1 | 1/2016 |

* cited by examiner

3D PRINT DEFINITION PROCEDURES

BACKGROUND

Additive manufacturing systems that generate three-dimensional objects on a layer-by-layer basis have been proposed as a potentially convenient way to produce three-dimensional objects.

In one example of additive manufacturing, an object is generated by solidifying portions of layers of build material. In some examples, the build material may be in the form of a powder.

In some such processes, energy may be applied to a build material. For example, energy may be applied to preheat the build material to a temperature which is close to its melting point. Energy may also be applied to cause melting, so that regions of the build material may fuse to form portions of an object.

BRIEF DESCRIPTION OF DRAWINGS

Examples will now be described, by way of non-limiting example, with reference to the accompanying drawings, in which.

DETAILED DESCRIPTION

Additive manufacturing techniques may generate a three-dimensional object through the solidification (or fusing) of a build material. In one example the build material may be powder-based and the properties of generated objects may depend on the type of build material and the type of solidification mechanism used. In a number of examples of such techniques including sintering and fusing techniques, build material is supplied in a layer-wise manner and the solidification method includes heating the layers of build material to cause fusing (melting) in selected regions. In other techniques, chemical solidification methods may be used.

In example additive manufacturing techniques, a fusing agent (also known as a coalescent agent) may be selectively ejected onto build material, for example using a print agent distributor such as an inkjet printhead. The fusing agent may be capable of absorbing radiation (radiant heat energy) and transferring thermal energy to build material in contact with the fusing agent. This may cause the build material to fuse (also known as sinter). Fusing agent may be ejected onto a layer of build material in a pattern corresponding to or based on a slice of a three-dimensional object, and the layer may be exposed to radiation to selectively fuse the build material to which fusing agent has been applied to form a layer of the object corresponding to the respective slice.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

A print device for additive manufacture may either receive model data relating to pre-generated slices for forming in layers, or may receive data relating to a three-dimensional model, which is then processed within the print device to generate slices, which are then formed in layers.

The applicant has found that additive manufacturing processes may result in unintended fusing around the boundary of an object. In particular, the applicant has found that additive manufacturing processes which apply heat to build material in order to cause selective fusing may result in unintended fusing outside a boundary of an object owing to thermal conduction from a fused area. It will be appreciated that a boundary of an object delineates an inside of the object (i.e. a solid portion of the object) and an outside of the object. Accordingly, references herein to a location outside a boundary boundary are not restricted to external surfaces of the object. In particular, objects may have boundaries defining internal cavities, and a region outside such a boundary may lie within such a cavity.

The example methods, apparatus and machine readable instructions described herein relate to defining print data for additive manufacture of an object based on a print definition procedure selectable from a plurality of different print definition procedures. As will be described below, the print definition procedures of the plurality each comprise instructions to define a fusing reduction region to inhibit excess fusing that may occur (or may be predicted to occur) around an outside of a slice boundary of an object. Each of the print definition procedures have varying instructions for defining the fusing reduction, which may represent different trade-offs in performance in generating the object, for example, between strength, accuracy and resources (e.g. time and print agent).

Figure 1:
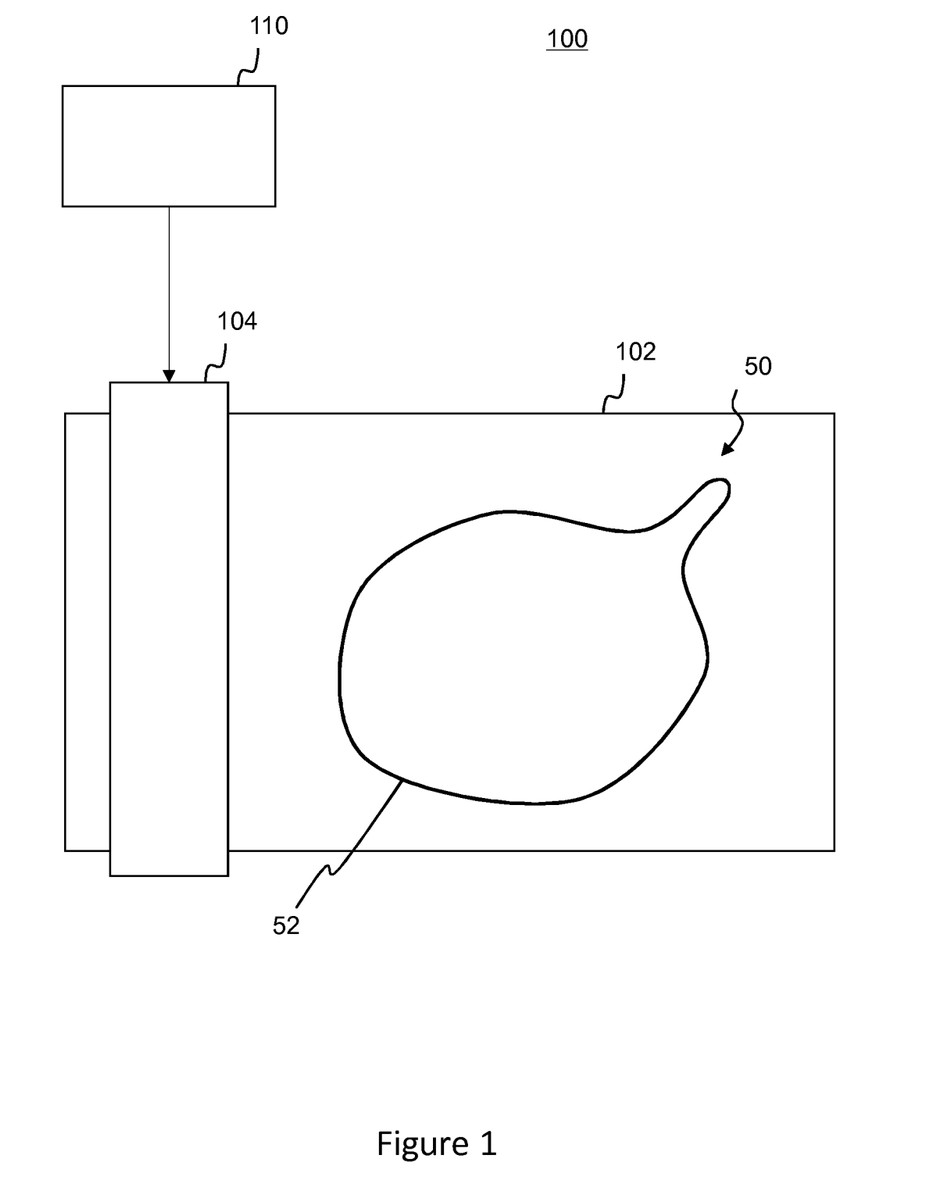
FIG. 1 is a simplified schematic view of an example additive manufacturing apparatus.

FIG. 1 schematically shows an example additive manufacturing apparatus 100 comprising a build platform (or print bed) 102 and a print agent distributor 104. In this example, the build platform 102 has a flat upper surface to receive a layer of build material 50, and may be moveable along a vertically downward direction during an additive manufacturing process so that additional layers of build material can be accommodated. The print agent distributor 104 is coupled to a source of print agent and is moveable over the build platform 102 for selectively ejecting the print agent onto the layer of build material 50 received thereon. In this example, the print agent distributor is an inkjet printhead to selectively eject the print agent. The particular printhead shown in this example is a a wide-array printhead extending along a first lateral direction over the build platform 102, or an array of printheads, sized to correspond to a first lateral dimension of the build platform 102. The printhead is provided with an actuator for moving it in an orthogonal second lateral direction (i.e. a second lateral direction orthogonal to the first lateral direction) over the build platform 102. In other examples the printhead may be a scanning printhead to traverse across the build platform 102 along two orthogonal directions. A wide-array printhead may have more nozzles than a scanning printhead, but may allow a faster print operation.

The additive manufacturing apparatus 100 further comprises a controller 110. In use, the controller 110 controls the print agent distributor 104 based on print data to selectively distribute print agent onto build material on the build platform 102, such as a fusing agent and/or a fusing reduction agent (or detailing agent). When exposed to radiant heat, the build material on which fusing agent is applied is selectively fused, as will be described in detail below.

In FIG. 1, an example layer of build material 50 is shown as received on the build platform 102 for illustrative purposes. The example layer of build material 50 is shown including a pattern of print agent defining a slice boundary 52 corresponding to a slice of an object to be manufactured.

Figure 2:
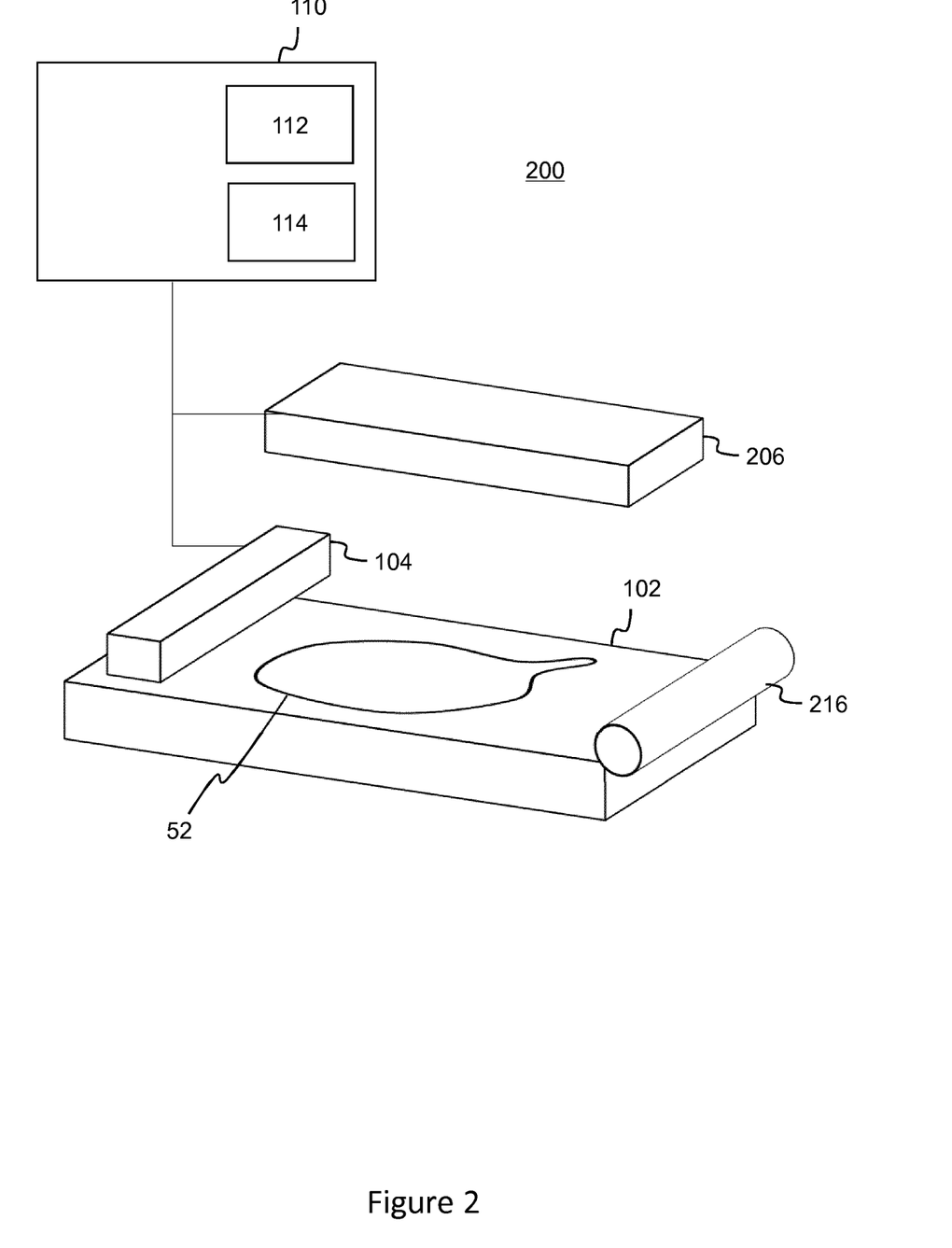
FIG. 2 is a simplified schematic view of a further example additive manufacturing apparatus.

FIG. 2 schematically shows a further additive manufacturing apparatus 200. The apparatus 200 differs from the apparatus 100 described with respect to FIG. 1 in that it additionally comprises a fixed radiation source (or heat lamp) 206 statically positioned overhead the build platform 102, and an applicator roller 216 moveable over the build platform to apply successive layers of build material from a build supply onto the build platform 102. In this example, the build platform 102 is to move downwards (i.e. in a stack-wise direction (or Z direction) so that the plurality of layers can be stacked in a vertical, or stack-wise, or Z direction.

In this example, the fixed radiation source 206 is disposed at a level above the build platform 102 and is to selectively emit radiant heat onto the build platform 102 (or a layer of build material and print agent received thereon). In this example, the fixed radiation source 206 is an infrared heat lamp. Further, in this example the print agent distributor 104 comprises an integrated radiation source (for example, a heat lamp) to emit radiant heat onto the build platform 102 as the print agent distributor 104 traverses the build platform 102. In use, the controller controls the fixed radiation source 206 and the integrated radiation source (i.e. a heat lamp for fusing) to activate to result in the selective fusing of build material, as will be described in detail below.

The controller comprises a processor 112 to execute machine-readable instructions and a memory 114 to store machine-readable instructions which, when executed, cause the controller to carry out a method of defining print data, and/or a method of additive manufacture, as will be described below. The memory 114 may store print data for additive manufacture of an object including a shield feature. The print data may be received in the memory 114, or may be defined by the controller 110 based on object data relating to the object as will be described in detail below.

It will be appreciated that the additive manufacturing apparatus may further comprise additional components. For example, the additive manufacturing apparatus may comprise a casing housing the above components, there may be a supply of build material, and there may be a heater for pre-heating the build material. Further, it will be appreciated that the controller 110 may additionally control other functions of the apparatus 100, for example, any movement of the build platform 102 and the definition of modification of print data.

Figure 3:
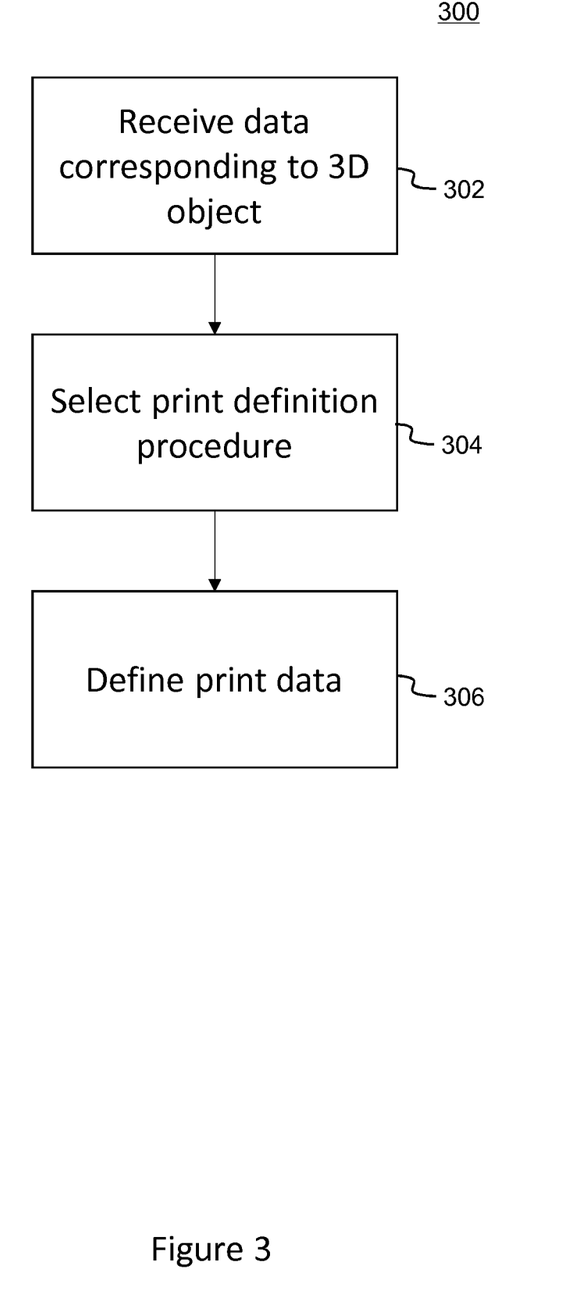
FIG. 3 is a flowchart of an example method of defining print data for additive manufacture.

FIG. 3 shows a flowchart setting out an example of a method 300 of defining print data. The method will be described by reference to the apparatus and layer of build material shown in FIG. 2, for illustrative purposes. In block 302, object data corresponding to a three-dimensional object to be generated in a layer-wise manner is received. In this particular example, the object data is received in the form of pre-generated slices defining the geometry of the object over successive parallel planes. However, in other examples the object data may be received in the form of a three-dimensional (3D) model, which may then be processed to define respective slices of the object.

In block 304, a print definition procedure to define print data for additive manufacture is selected. In this example, the print definition procedure is selected by way of a user interface presenting a plurality of different print definition procedures in a manner to indicate their performance characteristics. For the purposes of the present disclosure, example print definition procedures will be described with reference to their performance characteristics as follows: a strength procedure, an accuracy procedure, a cosmetic procedure, a stability procedure, a balance procedure and a speed procedure. It will be understood that each print definition procedure comprises instructions that serve to optimise the corresponding characteristic (i.e. high-accuracy, high-strength etc.). The various print definition procedures will be described in more detail below with respect to FIGS. 6 to 10.

In block 306, the print data is defined based on the object data and the selected print definition procedure. The print data comprises instructions to control the print agent distributor 104 (e.g. the printhead) during a print operation. In this particular example, the print data is defined for each respective slice of the object to be formed in respective layers, and includes two-dimensional pixel information for each slice defining the or each region for solidification by fusing (fusing regions), together with information defining each region for fusing reduction (fusing reduction regions). For example, the pixel information may be defined in an image format, such as a bitmapped image comprising a matrix of pixel locations corresponding to a layer of build material to be selectively fused to form a layer of the object corresponding to a respective slice. In an example, a default pixel location value may be 0, a pixel location in a fusing region may be 1, and a pixel location in a fusing reduction region may be 2. The pixel information may be referred to as image data.

In this example, pixel locations corresponding to the slice of the object (i.e. solid regions of the object) are assigned a pixel value of 1 to define a fusing region for selective fusing having a slice boundary. At this stage, the remaining pixel locations have a pixel value of 0 and correspond to regions that are not intended to be fused, for example, a region surrounding the slice boundary, or corresponding to a cavity within the object.

In examples disclosed herein, a fusing reduction region is subsequently defined based on the selected print definition procedure to inhibit excess fusing in a region, such as outside a respective slice boundary. For example, a fusing reduction region may serve as a heat sink for thermal conduction from an adjacent portion of build material during a layer forming operation, or directly cool build material corresponding to the fusing reduction region, thereby preventing excessive heat transfer to build material outside of the slice boundary that could otherwise cause the build material to reach its fusing temperature and become fused.

In some examples, the fusing reduction region is defined by the omission of a fusing agent, or the application of fusing agent in a reduced concentration (relative to a fusing region) when the fusing reduction region is located within the slice boundary. In other examples, the fusing reduction region may be defined by the application? of a fusing reduction agent (e.g. irrespective of whether the fusing reduction region is inside or outside of a respective slice boundary). In examples described herein, when the fusing reduction region is to be defined by the omission of a fusing agent, no fusing reduction agent is to be ejected in the respective region. Further, when the fusing reduction is to be defined by the ejection of a fusing reduction agent, no fusing agent is to be defined in the respective region.

In the particular example method of FIG. 3, the print data is defined to discriminate between fusing reduction regions to be defined by the omission of a fusing agent (i.e. within a slice boundary), and fusing reduction regions to be defined by the ejection of a fusing reduction agent. In this example, a fusing reduction region to be defined by the ejection of a fusing reduction agent is assigned a pixel value of 2. Further, in this example a fusing reduction region to be defined by the omission of a fusing agent (or the application of fusing agent in a reduced concentration) is assigned a pixel value of 3.

In other examples, different image data (pixel information) may be defined for the ejection of a fusing agent, and for the ejection of a fusing reduction agent, such that a fusing region and a fusing reduction region may overlap.

Further, in some examples described herein, image data (pixel information) may be defined separately for different fusing passes of the same layer of build material to enable different fusing regions and fusing reduction regions to be defined in successive fusing passes (i.e. traverses of the print agent distributor 104 and integrated radiation source).

In some examples, a fusing region may be defined over a core region of a slice (i.e. within the slice boundary) for a first fusing pass to result in selective solidification, and a fusing reduction region may be defined over the core region (i.e. within the slice boundary) for a second fusing pass. In such an example, the fusing reduction region is considered to inhibit fusing outside the slice boundary because the heat transfer to the build material in the second fusing pass (for example, the heat transfer per unit of radiant heat) will be less than in the first fusing pass.

In this example, the print data is defined to include concentration instructions relating to the concentration of fusing agent and any fusing reduction agent to be applied separately to the definition of image data, so that the concentration of each respective agent is uniform within the respective regions. In other examples, concentration information may be embedded in image data, for example by assigning pixel values which are dependent on concentration.

Further, in this example the print data is defined to include scheduling information for the application of print agent in each layer forming operation. In particular, in this example the scheduling information defines the number of passes, and correlates image data to each pass. It will be appreciated that image data for the definition of respective fusing regions and fusing reduction regions may vary between fusing passes. In other examples, scheduling information may include further information regarding other printer parameters, for example relating to the radiation sources and the movement of the print carriage.

The definition of the print data, based on a respective print definition procedure, will be described in more detail below with respect to the example print definition procedures of FIGS. 6 to 10.

Figure 4:
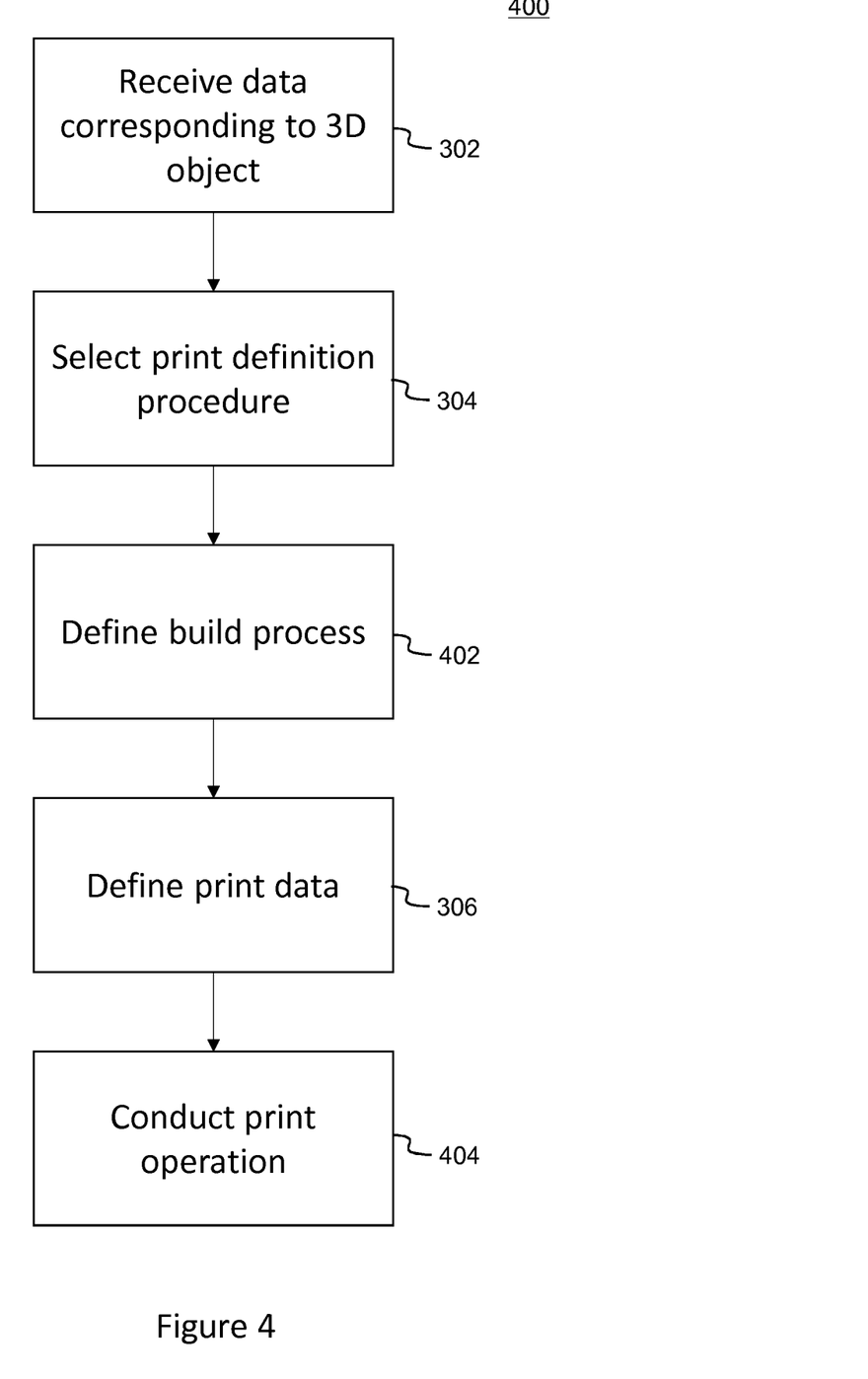
FIG. 4 is a flowchart of an example method of additive manufacture.

FIG. 4 shows a flowchart setting out an example method 400 of defining print data and conducting a print operation. The method 400 is based on the method 300 of defining print data described above with respect to FIG. 3. In blocks 302 and 304, object data is received and a print definition procedure is selected as described above.

In block 402, build data is defined for a build process. In this example, the build data defines parameters for controlling an additive manufacturing apparatus, such as for controlling the fixed radiation source 206 and the integrated radiation source in the print agent distributor 104, and for controlling movement of the print agent distributor 104. In an example, build data may be defined at least partly based on print data, for example a build data parameter may depend on the number of scheduled fusing passes for a respective layer forming operation.

In block 306, the print data is defined as described above.

In block 404, a print operation is conducted in which the object is formed in successive layers corresponding to respective slices of the object. The print operation comprises a sequence of layer forming operations, each layer forming operation resulting in the formation of a layer corresponding to a respective slice of the object. In this example, in each layer forming operation, print agent is ejected onto a respective layer 50 of build material applied on the build platform 102 in a pattern corresponding to selective fusing of the build material, the layer of build material is caused to be selectively fused by a predetermined number of fusing passes, and the build platform 102 is recoated with a further layer of build material. A layer forming operation may otherwise be referred to as a print cycle.

In this example, a fusing agent is ejected to define a respective fusing region, and a fusing reduction agent is ejected to define a respective fusing reduction region.

For example, the fusing agent may be a thermally-conductive agent, such as a printing liquid, for example a fluid-based agent or ink based on carbon black pigments (for example, a formulation known as CM997A available from HP Inc.). Such fusing agents may be dark in shade (for example, substantially black). Such fusing agents may absorb infrared radiation. Further, an example fusing reduction agent may comprise water ejected at a temperature below a fusing temperature of the build material, for example at least 20° C. below the fusing temperature of the build material. The fusing reduction agent may provide a cooling effect my vaporising in response to radiant heat. The fusing reduction agent may additionally comprise other additives, such as a pigment agent.

Radiant heat is applied by the fixed radiation source 206 and also by the integrated radiation source in the print agent distributor as it traverses the build platform 102 to eject print agent. As described above, the fusing agent serves to promote the transfer of radiant heat to build material in the fusing regions, whereas the fusing reduction agent serves to cool build material and/or inhibit excessive temperature rise in the build material to which it is applied. Accordingly, during the layer forming operation the radiant heat is applied to cause the build material in the fusing regions to fuse.

Depending on the geometry of a fusing region, excess heat may be generated within the fusing region. For example, a fusing region may be particularly susceptible to excess heat generation when the geometry represents a relatively large solid object, as opposed to a relatively thin or hollow object. It will be appreciated that the amount of heat transfer to build material in a fusing region may be proportional to the surface area of the fusing region, whereas the amount of thermal conduction from build material within the fusing region to laterally adjacent portions of the respective layer of build material may be proportional to the perimeter size of the fusing region (i.e. a length dimension around the slice boundary). Accordingly, fusing regions having a relatively larger ratio of surface area to perimeter may be more susceptible to excess heat generation (such as a circular geometry), whereas fusing regions having a relatively smaller ratio may be less susceptible to excess heat generation (such as a high aspect ratio rectangular fusing region).

In the example print operation of FIG. 4 (block 404), excess heat generated in build material within a fusing region may result in thermal conduction to a fusing reduction region, so as to inhibit thermal conduction outside of the slice boundary that would otherwise result in excess fusing. In this example, the location and other parameters of the fusing reduction region as applied on build material depend on print data defined according to the selected print definition procedure. The print definition procedures will now be described with reference to the example slice of FIG. 5, and example patterns for selectively fusing a layer of an object corresponding to the slice as shown in FIGS. 6 to 10.

Figure 5:
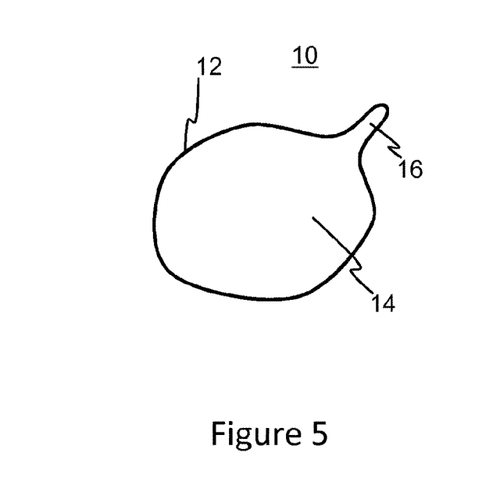
FIG. 5 is a simplified schematic view of an example slice of an object to be generated.

FIG. 5 shows an example slice 10 of an object for a layer forming operation. As will be described in detail below with respect to the example print definition procedures of FIGS. 6 to 10, the slice 10 has a slice boundary 12, a core region 14 within the slice boundary and corresponding to a major part of the object, and a minor region 16 extending from the core region 14 and corresponding to a minor part (i.e. a minor geometric feature) of the object. In this example, the slice has a major diameter of approximately 25 mm, the core region 14 is generally circular and the minor region is in the form of a generally elongate protrusion having a tapering thickness in the plane of the slice 10 which varies from approximately 3 mm to below 2 mm along the direction away from the core region 14. The area within the slice boundary 12 is intended to be fused, and in examples described herein fusing regions are defined within the slice boundary 12 so that build material corresponding to the region within the slice boundary 12 becomes fused, in use.

In an example, a minor region of a slice may be determined by evaluating the planar slice geometry to determine locations where a thickness in the plane of the slice is less than a threshold dimension, such as 2 mm. In an example, the planar slice geometry may be evaluated by eroding the slice boundary by half the threshold dimension, for example 1 mm, and subsequently dilating the modified slice boundary by the same amount to define a check boundary. For a slice having no regions below the threshold dimension, the erosion and dilation processes should return a check boundary that is the same as the original slice boundary. However, where a slice includes a region having a planar thickness at or below the threshold dimension, the respective region would be effectively deleted by the erosion process and would therefore not be re-created by the subsequent dilation process. In an example, regions present in both the original slice boundary and the check boundary (the eroded and dilated boundary) are determined as core regions, whereas regions present in the original slice boundary and not in the check boundary are determined as minor regions. In other examples, minor regions may be determined based on other criteria, such as by determining a minimum planar thickness of a part along two orthogonal axes (e.g. X and Y axes which may be parallel with respective edges of the build platform 102 or a virtual print boundary corresponding to the edge of a layer of build material). A minor region may be determined based on object data as part of a print definition procedure, as part of a pre-processing procedure for defining the print data, or may be pre-determined and defined in object data corresponding to a three-dimensional object to be generated.

FIGS. 6 to 10 illustrate example patterns for ejecting print agent as defined by different print definition procedures, for forming a layer of an object corresponding to a respective slice. Each of FIGS. 6 to 10 show at least one pattern for ejecting print agent on a respective layer of build material, each pattern corresponding to a respective fusing pass of a layer forming operation. Multiple patterns shown side-by-side represent multiple respective fusing passes, and in some examples the patterns vary between successive fusing passes. Each of the patterns and print definition procedures will be described by reference to an example slice 10 having a slice boundary 12, as shown in FIG. 5.

The following description refers to each of the print definition procedures according to example performance characteristics to which each one is correlated, for easy of reference.

Figure 6:
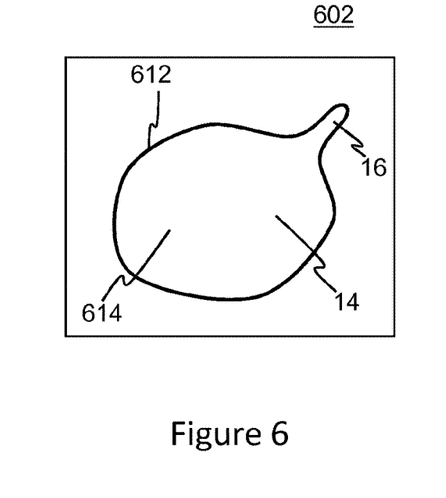
FIGS. 6 to 10 are simplified schematics of patterns for ejecting print agent in fusing passes according to an example print definition procedure.

FIG. 6 shows a pattern 602 for forming a layer of an object corresponding to the slice 10 of FIG. 5, as defined based on a speed print definition procedure for high-speed layer formation. The pattern 602 has a slice boundary 612 (which corresponds to the slice boundary 12 of the slice 10 of FIG. 5), and a fusing region 614 within the slice boundary 612. In this example the fusing region 614 is defined to extend over both the core region 14 and the minor region 16 of the slice 10.

The example speed print definition procedure comprises a scheduling instruction to schedule the ejection of fusing agent in the fusing region for one fusing pass of the respective layer of build material, so that the total number of fusing passes per layer forming operation is one. In this example, the fusing pass comprises a combination pass in which print agent is ejected onto build material and fusing occurs from both the integrated radiation source that moves with the print agent distributor 104 and the fixed radiation source in one movement from left-to-right or right-to left, as shown in FIGS. 1 and 2. In other examples, a fusing pass may comprise a first stage (e.g. left-to-right movement of the print agent distributor 104) in which print agent is ejected, and a second stage (e.g. right-to-left movement) in which the integrated radiation source is activated for fusing.

A cycle time for a layer forming operation based on the speed print definition procedure may be relatively low, for example 8 seconds, based in part on the single fusing pass and the omission of a fusing reduction region. In addition, the speed print definition procedure may comprise instructions to use a relatively high layer thickness to reduce the overall generation time of the object.

It will be appreciated that the pattern defined based on the speed print definition procedure does not include a fusing reduction region, and the speed print definition procedure in this example does not include a location instruction to define a fusing reduction region.

Figure 7:
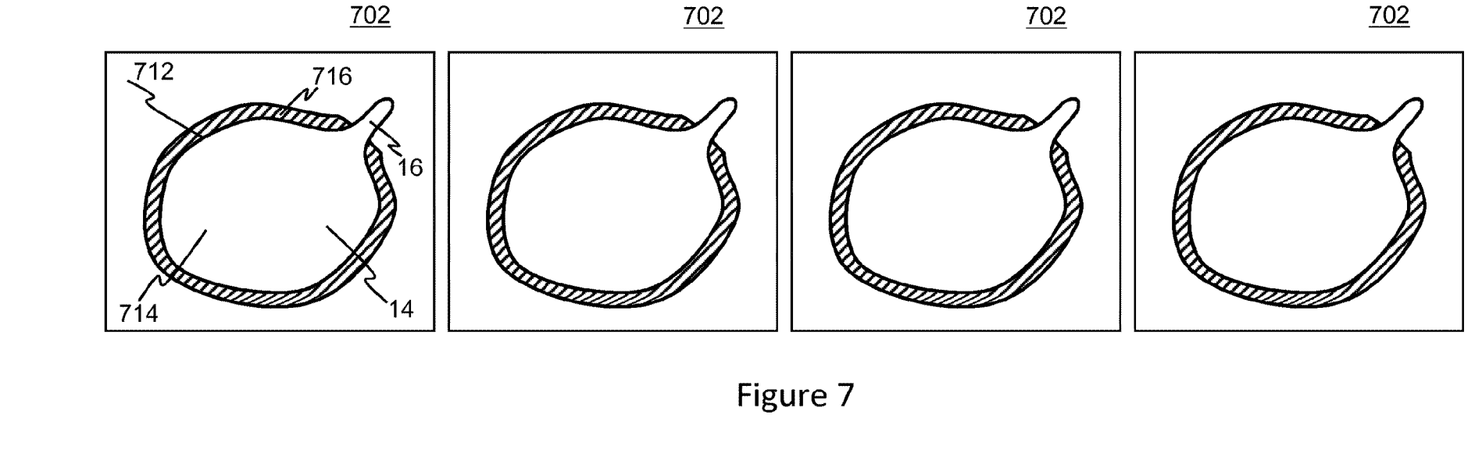

FIG. 7 shows a pattern 702 for forming a layer of an object corresponding to the slice 10 of FIG. 5, as defined based on a strength print definition procedure of the plurality of print definition procedures. As shown in FIG. 7, the pattern 702 is repeated, and print agent ejected accordingly, for four successive fusing passes.

In this example, the pattern 702 defines a slice boundary 712 (which corresponds to the slice boundary 12 of the slice 10 of FIG. 5) and a fusing region 714 within the slice boundary 712 and defined to extend over both the core region 14 and the minor region 16 of the slice 10.

The example strength print definition procedure includes a location instruction to define a fusing reduction region 716 around the outside of the slice boundary 712 having a planar thickness of approximately 3 mm. The planar thickness may correspond to the dimension of the fusing reduction region 716 along a direction normal to the slice boundary 712 and within the plane of the slice. Since the fusing reduction region 716 is outside of the print boundary, the print data is defined so that the fusing reduction region is defined by the ejection of a print agent comprising a fusing reduction agent.

In this particular example, the location instruction is to define the fusing reduction region 716 around the outside of the slice boundary 712 and to exclude portions of the slice boundary corresponding to the minor region 16. In this example, the portions of the slice boundary corresponding to the minor region 16 are predetermined in object data received for processing, but in other examples the portions of the slice boundary corresponding to the minor region 16 may be determined as part of defining the print data based on the strength print definition procedure. Accordingly, as shown in FIG. 7, the fusing reduction region 716 does not extend around the portion of the slice boundary 712 corresponding to the minor region 16 of the slice 10.

The example strength print definition procedure includes a scheduling instruction to schedule the ejection of fusing reduction agent to define the fusing reduction region 716 for each of four fusing passes of a layer forming operation. Accordingly the total number of fusing passes in a layer forming operation based on print data defined based on the example strength print definition procedure is four.

Further, the example strength print definition procedure includes a concentration instruction to define the concentration of fusing reduction agent to be applied in the fusing reduction region at a relatively high level. In an example, the concentration of fusing reduction agent may be defined by the number of drops of fusing reduction agent ejected per pixel in the pattern of print agent. In an example, in a layer forming operation in which a pattern is ejected at a resolution of 600 pixels per inch, a high concentration of fusing reduction agent may be four drops per pixel. This may equate to approximately 40 ng (nanograms) of fusing reduction agent in a pixel surface area of approximately 42 microns by 42 microns.

A strength characteristic of an object generated based on print data defined according to the strength print definition procedure may be relatively high. For example, multiple fusing passes may enable build material corresponding to the fusing region 714 to fuse and remain fused between successive passes during the layer forming operation owing to a relatively high level of radiant heat which is transferred to the corresponding build material. Multiple fusing passes may enable fused build material of a first layer to remain at a temperature above the fusing temperature whilst a successive second layer is applied and fused, thereby enabling strong bonds between the successive layers. It will be appreciated that the multiple fusing passes may result in an excess of heat within the slice boundary 712 during a layer forming operation, and the application and re-application of a fusing reduction region around the outside of the slice boundary 712 may inhibit excess fusing outside of the slice boundary by maintaining build material corresponding to the fusing reduction region below the fusing temperature of the build material. However, the cycle time and resources, in terms of energy, fusing agent and fusing reduction agent may be relatively high. Further, the relatively high amount of radiant heat transferred to the build material may result in some excess fusing outside the slice boundary 712, despite the fusing reduction region 716. Defining the fusing reduction region to exclude portions of the slice boundary 712 corresponding to the minor region 16 may result in relatively high object strength in the portion of the object corresponding to the minor region, but may also result in excess fusing in this region. A cycle time for a layer forming operation based on the strength print definition procedure may be relatively high, for example 18 seconds.

Figure 8:
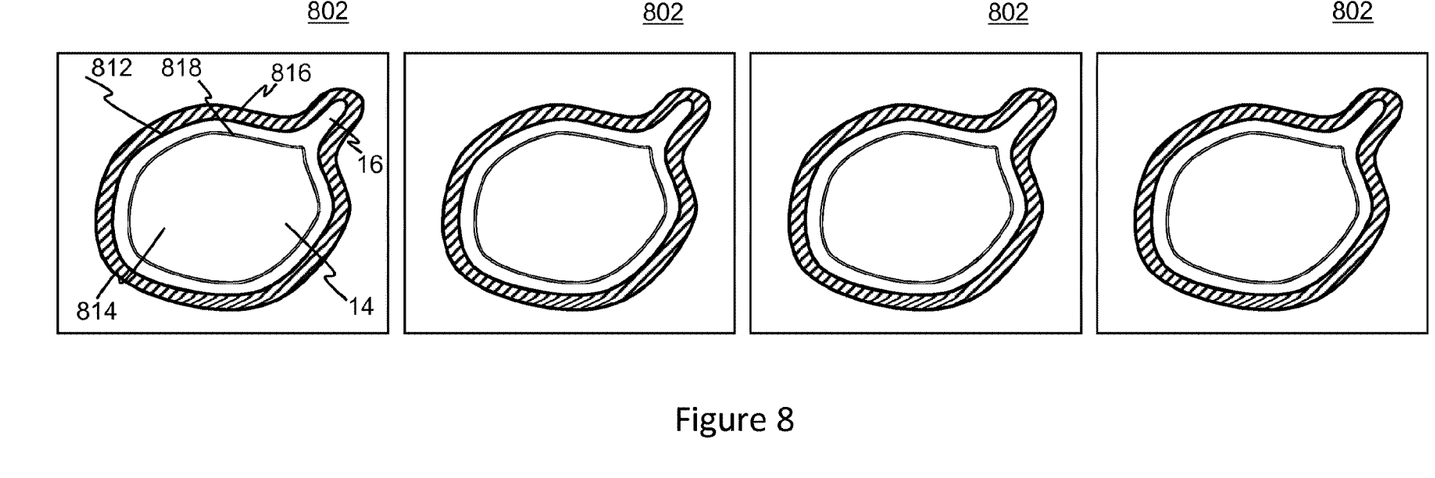

FIG. 8 shows a pattern 802 for forming a layer of an object corresponding to the slice 10 of FIG. 5, as defined based on a cosmetic print definition procedure of the plurality of print definition procedures. As shown in FIG. 8, the pattern 802 is repeated, and print agent ejected accordingly, for four successive fusing passes.

In this example, the pattern 802 defines a slice boundary 812 (which corresponds to the slice boundary 12 of the slice 10 of FIG. 5) and a fusing region 814 within the slice boundary 812 and defined to extend over both the core region 14 and the minor region 16 of the slice 10.

The example cosmetic print definition procedure includes a location instruction to define a primary fusing reduction region 818 embedded within the slice boundary 812 and the fusing region 814, and spaced apart from the slice boundary 812. In this example, the primary fusing reduction region 818 has a thickness in the plane of the slice of approximately 0.5 mm and is spaced apart from the slice boundary 812 along a direction normal to the slice boundary 812 in the plane of the slice by approximately 2 mm. In other examples, the thickness of the primary fusing reduction region and its location with respect to the slice boundary 812 may be different, for example the thickness in the plane may be between 0.1 mm and 1 mm, and the spacing from the slice boundary 812 may be between 0.5 mm and 3 mm. In this example, the primary fusing reduction region 818 is defined by the ejection of a fusing reduction agent in the primary fusing reduction region 818. In other examples, the primary fusing reduction region 818 may be defined by the omission of fusing agent in the primary fusing reduction region 818, so that the fusing of build material in the fusing reduction region 818 is inhibited relative the fusing of adjacent portions of build material within the fusing region 814, to which fusing agent has been applied to promote fusing.

Further, the location instruction is to define a secondary fusing reduction region 816 around the outside of the slice boundary 812 having a planar thickness of approximately 3 mm. The location instruction is to define the secondary fusing reduction around the outside of the slice boundary 812 including any portions of the slice boundary 812 corresponding to minor regions of the slice. As in the strength print definition procedure, the secondary fusing reduction region is outside of the slice boundary and so will be defined by the ejection of a fusing reduction agent.

The example cosmetic print definition procedure includes a scheduling instruction to schedule the ejection of fusing reduction agent to define the fusing reduction region 816 for each of four fusing passes of a layer forming operation. Accordingly the total number of fusing passes in a layer forming operation based on print data defined based on the cosmetic print definition procedure is four.

Further, the example cosmetic print definition procedure includes a concentration instruction to define the concentration of fusing reduction agent to be applied in the fusing reduction region at a high level, for example 4 drops per pixel at 600 pixels per inch, as described above.

Cosmetic properties of an object generated based on print data defined according to the cosmetic print definition procedure may be favourable, as compared with other print definition procedures of the plurality. For example, multiple fusing passes may enable build material corresponding to the fusing region 814 to progressively increase in temperature to reach a fusing temperature of the build material over the course of the successive fusing passes, whilst the fusing reduction agent is applied at a relatively high concentration to inhibit any excess fusing outside the slice boundary 812. Inhibiting excess fusing using fusing reduction agent as described above may also have the effect of preventing unfused build material outside the slice boundary from adhering to the surface of the object. Locally, due to non-uniform profiles in temperature and heat transfer, build material outside of a slice boundary may reach the fusing temperature and adhere to the surface of an object. This may result in an uneven or rough surface of the object, and may therefore affect the cosmetic appearance of the object. By using a relatively high concentration of fusing reduction agent, the temperature of build material around the outside of the slice boundary may be maintained uniformly below the fusing temperature, to inhibit unfused build material adhering to the object surface.

Further, the primary fusing reduction region 818 may serve as a heat sink embedded within the fusing region, thereby inhibiting excess heat from the fusing region 814 that is within the primary fusing reduction region 818 causing excess thermal conduction to the periphery of the slice, and thereby inhibiting excess fusing outside the slice boundary. In particular, the primary fusing reduction region 818 may enable the part of the fusing region 814 between the primary fusing reduction region 818 and the slice boundary 812 to be insulated from excess heat, and therefore the fusing response of this part of the fusing region 814 may be more predictable and uniform, which may result in an improved cosmetic appearance of the surface of the object. A cycle time for a layer forming operation based on the cosmetic print definition procedure may be relatively high, for example 16 seconds.

Figure 9:
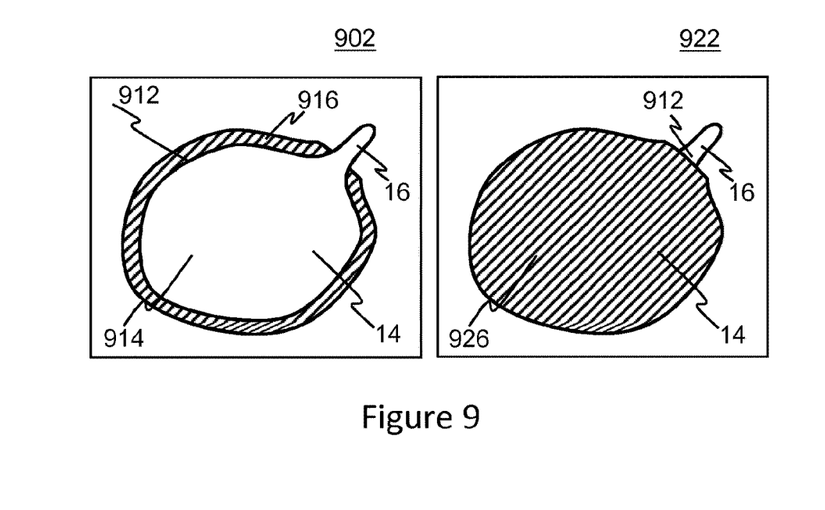

FIG. 9 shows a first pattern 902 and a second pattern 922 for forming a layer of an object corresponding to the slice 10 of FIG. 5, as defined based on an example accuracy print definition procedure of the plurality of print definition procedures. As shown in FIG. 9, there are first and second patterns 902, 922 which correspond to first and second fusing passes of each respective layer forming operation.

In this example, the first pattern 902 includes a slice boundary 912 (which corresponds to the slice boundary 12 of the slice 10 of FIG. 5) and a first fusing region 914 within the slice boundary 912 and defined to extend over both the core region 14 and the minor region 16 of the slice 10.

The example accuracy print definition procedure comprises a location instruction to define, for the first pattern 902, a first fusing reduction region around an outside of the slice boundary 912, excluding any portions of the slice boundary 912 corresponding to minor regions 16 of the slice, as described previously with respect to the secondary fusing reduction region of the strength print definition procedure.

The example accuracy print definition procedure comprises a concentration instruction to define the concentration of fusing reduction agent to be applied in the first fusing reduction region 916 at a relatively high level, for example at a concentration of 4 drops per pixel.

The location instruction is also to define, for the second pattern 922, a second fusing reduction region including the first fusing reduction region and also extending over the core region 14 of the slice 10, and a second fusing region 924 corresponding to the minor region 16 of the slice.

The concentration instruction is also to define the concentration of fusing reduction agent to be applied in the second fusing reduction region 926 at an intermediate level, for example at a concentration of 2 drops per pixel.

The example accuracy print definition procedure comprises a scheduling instruction to schedule the ejection of print agent to define the first fusing reduction region (and the first fusing region 914) for a first fusing pass of each layer forming operation, and to schedule the ejection of print agent to define the second fusing reduction region 926 (and the second fusing region 924) for a second fusing pass of each respective layer forming operation. Accordingly the total number of fusing passes in a layer forming operation based on print data defined based on the accuracy print definition procedure is two.

An accuracy characteristic of an objected generated based on print data defined according to the accuracy print definition procedure may be relatively high, as compared with other print definition procedures of the plurality. For example, in the first fusing pass the transfer of radiant heat through fusing agent in the fusing region 914 may be sufficient to fuse build material corresponding to the core region 14 of the slice, and the first fusing reduction region may serve to inhibit excess fusing outside the slice boundary 912. Accordingly, in the second fusing pass no further fusing of the build material corresponding to the core region 14 may be done, and so the second fusing reduction agent may serve to inhibit excess heat build up in the core region during the second fusing pass and thereby inhibit excess fusing. In the second pass, fusing agent is applied in the second fusing region 924 corresponding to the minor region 16 of the shell, and no fusing reduction agent is applied around the minor region 16 so that the temperature of build material corresponding to the minor region may rise sufficiently owing to radiant heat transferred through the fusing agent to cause the minor region to fuse. Therefore, the second fusing pass may enable fusing to complete in the minor region without causing excess heat in the core region.

The applicant has found that two fusing passes as described above may enable high accuracy generation of an object where accuracy, as opposed to bonding strength, is a priority. A cycle time for a layer forming operation based on the accuracy print definition procedure may be at an intermediate level, compared with the plurality of print definition procedures, for example 12 seconds.

Figure 10:
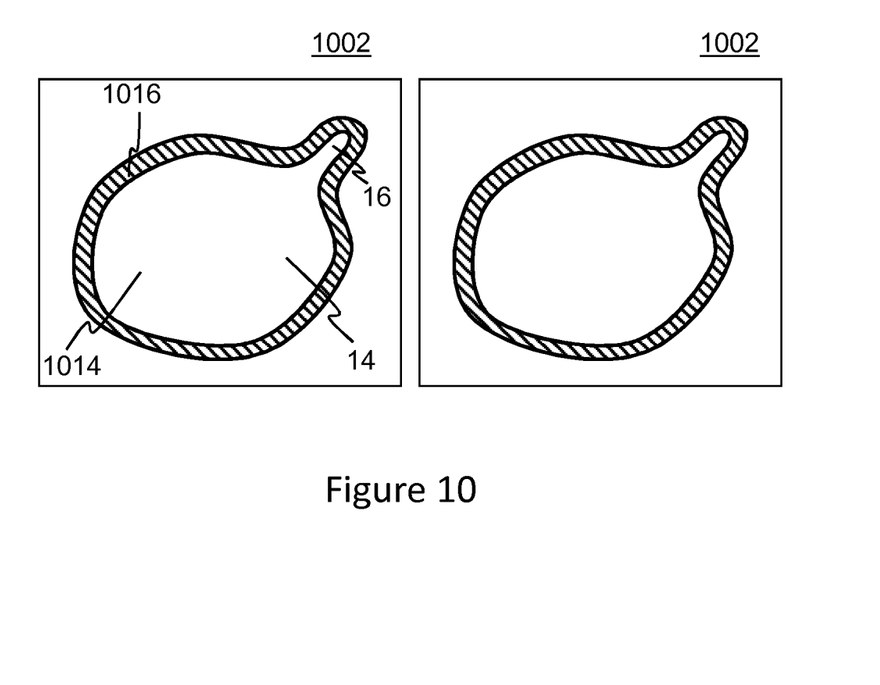

FIG. 10 shows a pattern 1002 for forming a layer of an object corresponding to the slice 10 of FIG. 5, as defined based on a balanced print definition procedure of the plurality of print definition procedures. As shown in FIG. 10, the pattern 1002 is repeated, and print agent ejected accordingly, for two successive fusing passes.

In this example, the pattern 1002 includes a slice boundary 1012 (which corresponds to the slice boundary 12 of the slice 10 of FIG. 5) and a fusing region 1014 within the slice boundary 1012 and defined to extend over both the core region 14 and the minor region 16 of the slice 10.

The example balanced print definition procedure includes a location instruction to define a fusing reduction region 1016 around the outside of the slice boundary 1012 having a planar thickness of 3 mm. The location instruction is to define the fusing reduction region around the outside of the slice boundary 1012 including any portions of the slice boundary 1012 corresponding to minor regions of the slice. As with the strength print definition procedure and the cosmetic print definition procedure, the fusing reduction region is outside of the slice boundary and so will be defined by the ejection of a fusing reduction agent.

The example balanced print definition procedure includes a scheduling instruction to schedule the ejection of fusing reduction agent to define the fusing reduction region 1016 for each of two fusing passes of a layer forming operation.

Accordingly the total number of fusing passes in a layer forming operation based on print data defined based on the balanced print definition procedure is two.

Further, the example balanced print definition procedure includes a concentration instruction to define the concentration of fusing reduction agent to be applied in the fusing reduction region 1016 at an intermediate level, for example at a concentration of 2 drops per pixel.

The performance characteristics of the balanced print definition procedure may be balanced, as compared to the other print definition procedures of the plurality. For example, the ejection of an intermediate concentration of fusing reduction agent over two successive fusing passes may result in an intermediate accuracy characteristic, for example, between that which would be achieved by the accuracy and strength print definition procedures. Further, the strength characteristic may be at an intermediate level, for example between that which would be achieved the accuracy and strength print definition procedures. The cosmetic characteristic may be at a level between that which would be achieved by the cosmetic and strength print definition procedures. Further, the time and materials resources consumed in the balanced print definition procedure may be at an intermediate level, for example between the draft print definition procedure and the accuracy print definition procedure. A cycle time for a layer forming operation based on the balanced print definition procedure may be at an intermediate level, compared with other example print definition procedures of the plurality, for example 12 seconds.

In an example, the balanced characteristic may be pre-selected and/or presented to a user as a default option.

Table 1 below shows an example grading of performance characteristics for each of the print definition procedures described above, wherein 3 indicates the highest level of performance of the respective characteristic (e.g. high speed, low use of resources), and 1 indicates the lowest level of performance (e.g. low strength, low accuracy).

TABLE 1

| Print Definition Procedure | Time Resource | Print Agent Resource | Energy Resource | Strength Characteristic | Accuracy Characteristic | Cosmetic Characteristic |
|---|---|---|---|---|---|---|
| Speed | 3 | 3 | 3 | 1 | 1 | 1 |
| Strength | 1 | 2 | 1 | 3 | 2 | 2 |
| Cosmetic | 1 | 1 | 2 | 1 | 2 | 3 |
| Accuracy | 2 | 2 | 2 | 1 | 3 | 2 |
| Balanced | 2 | 2 | 2 | 2 | 2 | 2 |

In some examples disclosed herein references are made to quantities which may differ between print definition procedures, such as a concentration of print agent to be applied. It will be appreciated that such quantities may not be predetermined according to the print definition procedure, and may instead be determined based on thermal modelling, for example, by thermal modelling to predict a temperature map of build material during a layer forming operation. Nevertheless, it will be appreciated that such thermal modelling may determine a baseline quantity, such as a baseline concentration, and the example print definition procedures may comprise instructions to define a specific quantity, such as a high or intermediate concentration, relative to the baseline concentration. Accordingly, at least two print definition procedures may define such a quantity, such as a concentration of fusing reduction agent, differently based on the same thermal modelling. The same may apply to other such quantities, for examples, a planar thickness of a fusing reduction region.

In some examples disclosed herein input is received from a user by virtue of, for example, options being presented to a user (e.g. on an interactive display). It will be appreciated that user input may include input through a user interface for a particular print operation, a definition in instructions for a print operation (for example, an instruction in a batch file for one or more print operations), or instructions received in other methods. For example, object data may be received from a particular user (e.g. a customer), and in example methods there may be a lookup for a pre-selected mode correlated to the customer (for example, based on the user's priority, e.g. speed or accuracy). Such a lookup operation may refer to a remotely-stored database. In such an example, the pre-selected mode constitutes a user input. It will be appreciated that there may be many other methods by which a user input may be received.

Examples in the present disclosure can be provided as methods, systems or machine-readable instructions, such as any combination of software, hardware, firmware or the like. Such machine-readable instructions may be included on a machine-readable storage medium (including but is not limited to disc storage, CD-ROM, optical storage, etc.) having machine-readable program codes therein or thereon.

Figure 11:
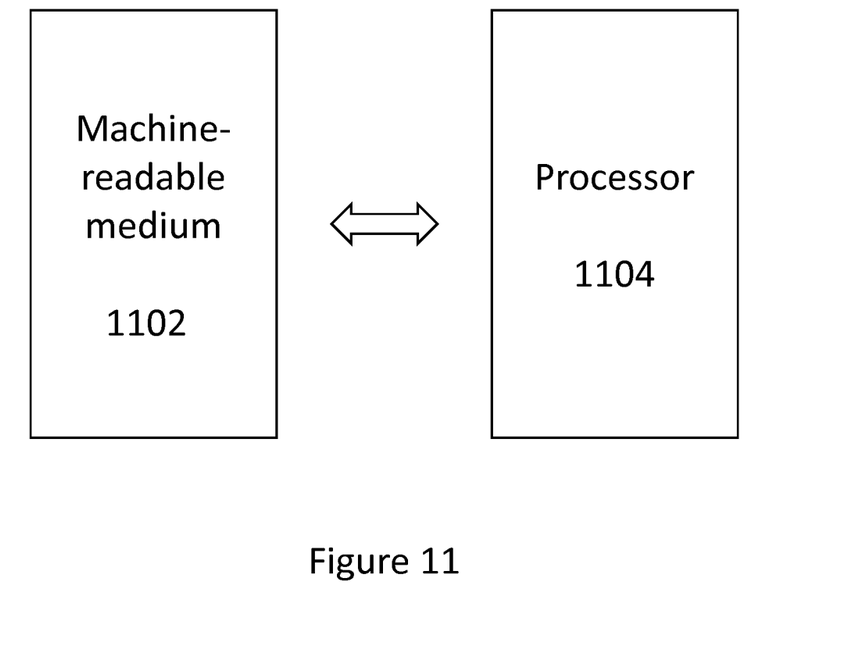
FIG. 11 is a simplified schematic view of an example machine-readable storage medium and instructions, and a processor.

FIG. 11 shows a non-transitory machine-readable medium 1102 encoded with instructions executable by a processor 1104. In an example, the instructions include instructions to receive object data corresponding to a three-dimensional object to be generated, and define print data to control a respective layer forming operation for each of a plurality of slices of the object as described above. In this example, the instructions include instructions to select the print definition procedure from a plurality of print definition procedures based on a user input. In this example, the instructions include instructions relating to each of the plurality of print definition procedures, and at least one of a location instruction, a scheduling instruction and a concentration instruction varies between the print definition procedures.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine-readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus functional modules of the apparatus and devices may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a machine-readable storage that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A non-transitory machine readable storage medium encoded with instructions executable by a processor and comprising instructions to:
   receive object data corresponding to a three-dimensional object to be generated in a layer-wise manner;
   for each of a plurality of slices of the object, define print data to control a respective layer forming operation in which print agent is ejected on a layer of build material in a pattern corresponding to selective fusing of the build material, wherein the print data and the respective pattern is defined for each slice according to a print definition procedure;
   select the print definition procedure from a plurality of print definition procedures based on a user input; and
   define a fusing reduction region based on a selected print definition procedure;
   wherein each of the print definition procedures is to define a pattern for forming a respective layer of the object including a slice boundary and the fusing reduction region of the layer to inhibit excess fusing outside the slice boundary; and
   wherein at least one of the following varies between the print definition procedures:
      a location instruction to define a location of the fusing reduction region in the slice relative to the respective slice boundary;
      a scheduling instruction to schedule the ejection of print agent during a respective layer forming operation to define the fusing reduction region; and
      a concentration instruction to define a concentration of print agent for defining the fusing reduction region.

2. A non-transitory machine readable storage medium according to claim 1, wherein in at least one print definition procedure of the plurality of print definition procedures, a location instruction is to define the fusing reduction region embedded within and spaced apart from the respective slice boundary.

3. A non-transitory machine readable storage medium according to claim 1, wherein in at least one print definition procedure, the location instruction is to:
   define the fusing reduction region embedded within and spaced apart from the respective slice boundary; and
   define a further fusing reduction region around the outside of the slice boundary, wherein the further fusing reduction region receives a fusing reduction agent.

4. A non-transitory machine readable storage medium according to claim 1, wherein the instructions include instructions to determine minor geometric features extending from a core of the object; and
   wherein in at least a first one of the print definition procedures, a location instruction is to define the fusing reduction region around the outside of the slice boundary including around portions of the slice boundary corresponding to minor geometric features; and
   wherein in at least a second one of the print definition procedures, a location instruction is to define the fusing reduction region around the outside of the slice boundary excluding around portions of the slice boundary corresponding to minor geometric features.

5. A non-transitory machine readable storage medium according to claim 1, wherein the location instruction varies between the print definition procedures, and wherein in each print definition procedure of the plurality the location instruction comprises one of:
   an instruction to define the fusing reduction region around the outside of the slice boundary the respective slice;
   an instruction to define the fusing reduction region embedded within the respective slice and spaced apart from the slice boundary; and
   an instruction to define the fusing reduction region over a core region of the respective slice.

6. A non-transitory machine readable storage medium according to claim 1, wherein in at least one print definition procedure the location instruction is to define a first location of a first fusing reduction region for a first fusing pass, and is to define a different second location of a second fusing reduction region for a second fusing pass for the same respective slice.

7. A non-transitory machine readable storage medium according to claim 1, wherein in at least one of the print definition procedures, a location instruction is to:

define a first location of a first fusing reduction region around the outside of the respective slice boundary to surround a core region within the slice boundary; and
define a second location of a second fusing reduction region over the core region; and
wherein a scheduling instruction is to:
cause the first fusing reduction region to be defined in a first fusing pass of the respective layer of build material; and
cause the second fusing reduction region to be defined in a second fusing pass of the same respective layer.

8. A non-transitory machine readable storage medium according to claim 1, wherein in at least a first one of the print definition procedures, a scheduling instruction is to define a first number of fusing passes for each respective layer forming operation; and
wherein in at least a second one of the print definition procedures, a scheduling instruction is to define a second greater number of fusing passes for each respective layer forming operation.

9. A non-transitory machine readable storage medium according to claim 1, wherein in at least a first one of the print definition procedures, a concentration instruction is to define a first concentration of print agent comprising a fusing reduction agent for a respective fusing reduction region; and
wherein in at least a second one of the print definition procedures, a concentration instruction is to define a second higher concentration of the fusing reduction agent for a respective fusing reduction region.

10. A non-transitory machine readable storage medium according to claim 1, wherein each one of the plurality of print definition procedures is correlated to a performance priority, and wherein the instructions to select the print definition procedure comprise instructions to receive a user input relating to a performance priority.

11. A non-transitory machine readable storage medium according to claim 1, wherein the instructions to define print data for each of the plurality of slices comprises instructions to:
cause print agent comprising a fusing reduction agent to be ejected on build material corresponding to a fusing reduction region when the fusing reduction region is to be defined outside of a respective slice boundary.

12. A non-transitory machine readable storage medium according to claim 1, wherein the instructions to define print data for each of the plurality of slices comprise instructions to:
cause print agent comprising a fusing agent to be ejected at a first concentration in a fusing region within a respective slice boundary for at least one fusing pass of a respective layer forming operation; and
cause the fusing agent to be ejected at a second lower concentration, or cause no fusing to be ejected, in a fusing reduction region when the fusing reduction is to be defined within the respective slice boundary for at least one fusing pass of the respective layer forming operation.

13. A non-transitory machine readable storage medium according to claim 1, wherein at least two print definition procedures of the plurality of print definition procedures correspond to different minimum cycle times for respective layer forming operations.

14. Additive manufacturing apparatus comprising:
a controller to:
receive object data corresponding to a three-dimensional object to be generated in a layer-wise manner;
for each of a plurality of slices of the object, define print data to control a respective layer forming operation in which print agent is ejected on a layer of build material in a pattern corresponding to selective fusing of the build material, wherein the print data and the respective pattern is defined for each slice according to a print definition procedure;
select the print definition procedure from a plurality of print definition procedures based on a user input; and
define a fusing reduction region based on a selected print definition procedure;
wherein each of the print definition procedures is to define a pattern for forming a respective layer of the object including a slice boundary and the fusing reduction region in the layer to inhibit excess fusing outside the slice boundary; and
wherein the print definition procedures comprise:
a location instruction to define a location of the fusing reduction region relative the respective slice boundary;
a scheduling instruction to schedule the ejection of print agent during a respective layer forming operation to define the fusing reduction region; and
a concentration instruction to define a concentration of print agent for defining the fusing reduction region; and
a print agent distributor to eject, based on the print data:
a print agent onto fusing regions of the layer of build material; and
a fusing reduction agent onto the fusing reduction region of the layer of build material.

15. A method comprising:
receiving user input relating to a performance priority for an additive manufacturing process;
receiving object data corresponding to a three-dimensional object to be generated in a layer-wise manner;
for each of a plurality of slices of the object, defining print data to control a respective layer forming operation in which print agent is ejected on a layer of build material in a pattern corresponding to selective fusing of the build material, wherein the print data and the respective pattern is defined for each slice according to a print definition procedure;
selecting the print definition procedure from a plurality of print definition procedures based on the user input;
defining a fusing reduction region based on a selected print definition procedure;
wherein each of the print definition procedures:
is to define a pattern for forming a respective layer of the object including a slice boundary and the fusing reduction region in the layer to inhibit excess fusing outside the slice boundary; and
is to enhance a target performance characteristic;
wherein the following vary between the print definition procedures:
a location instruction to define a location of the fusing reduction region in the layer relative the respective slice boundary;
a scheduling instruction to schedule the ejection of print agent during a respective layer forming operation to define the fusing reduction region; and
a concentration instruction to define a concentration of print agent for defining the fusing reduction region;
ejecting a print agent onto fusing regions of the layer of build material; and ejecting a fusing reduction agent onto the fusing reduction region of the layer of build material.

16. A non-transitory machine readable storage medium according to claim 1, wherein the fusing reduction region receives a fusing reduction agent.

17. A non-transitory machine readable storage medium according to claim 1, wherein a first fusing reduction region receives a first fusing reduction agent and a second fusing reduction region receives a second fusing reduction agent.

18. A non-transitory machine readable storage medium according to claim 1, wherein a first fusing reduction region receives a first fusing reduction agent and a second fusing reduction region receives no fusing agent.

19. A non-transitory machine readable storage medium according to claim 1, wherein the user input selects a balanced print definition procedure.

20. A non-transitory machine readable storage medium according to claim 1, wherein the user input is obtained by looking up the user in a database.

\* \* \* \* \*